United States Patent [19]

Scura et al.

[11] 4,257,351
[45] Mar. 24, 1981

[54] BIVALVE PRODUCTION FLUME

[75] Inventors: Edward D. Scura, Kaaawa; Andrew M. Kuljis, Kahaluu, both of Hi.; Roger L. Courchesne, Burlington, Mass.

[73] Assignee: Aquatic Farms, Ltd., Oahu, Hi.

[21] Appl. No.: 31,000

[22] Filed: Apr. 18, 1979

[51] Int. Cl.³ ............................................. A01K 61/00
[52] U.S. Cl. .................................................... 119/4
[58] Field of Search ..................... 119/2, 3, 4; 405/119

[56] References Cited

U.S. PATENT DOCUMENTS

| 148,035 | 3/1874 | Clark | 119/3 |
|---|---|---|---|
| 3,122,126 | 2/1964 | Yamada | 119/3 |
| 3,526,209 | 9/1970 | Budge et al. | 119/4 |
| 3,763,824 | 10/1973 | Schoon | 119/4 |
| 3,766,888 | 10/1973 | Wiegardt, Jr. | 119/4 |
| 3,771,492 | 11/1973 | Doherty | 119/3 |
| 3,996,893 | 12/1976 | Buss | 119/3 |

Primary Examiner—Gene Mancene
Assistant Examiner—Robert P. Swiatek
Attorney, Agent, or Firm—Salter & Michaelson

[57] ABSTRACT

A flume for the production and growth of bivalves comprising a plurality of upwelling and production trenches contiguous to each other and in series with an upwelling trench located before each production trench, a water distribution system for effecting a continuous flow of water through said trenches, with each production trench having a conduit associated therewith for adding nutrient-bearing water to the main water supply coming from the previous upwelling trench, whereby each production trench receives the proper amount of nutrient for nourishing a supply of bivalves positioned therein.

17 Claims, 8 Drawing Figures

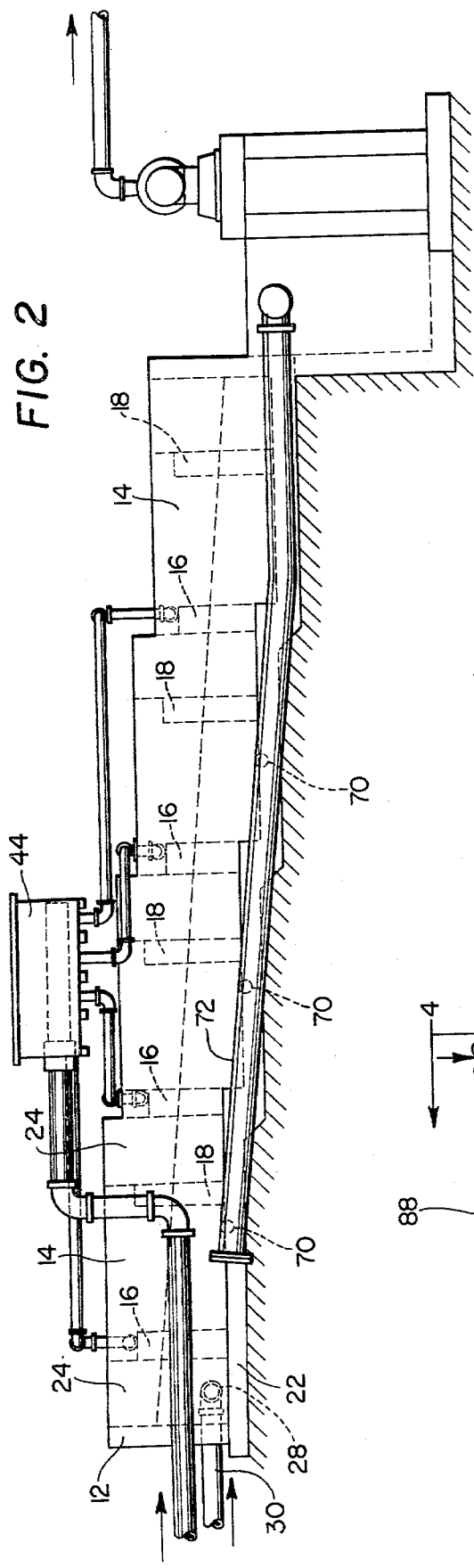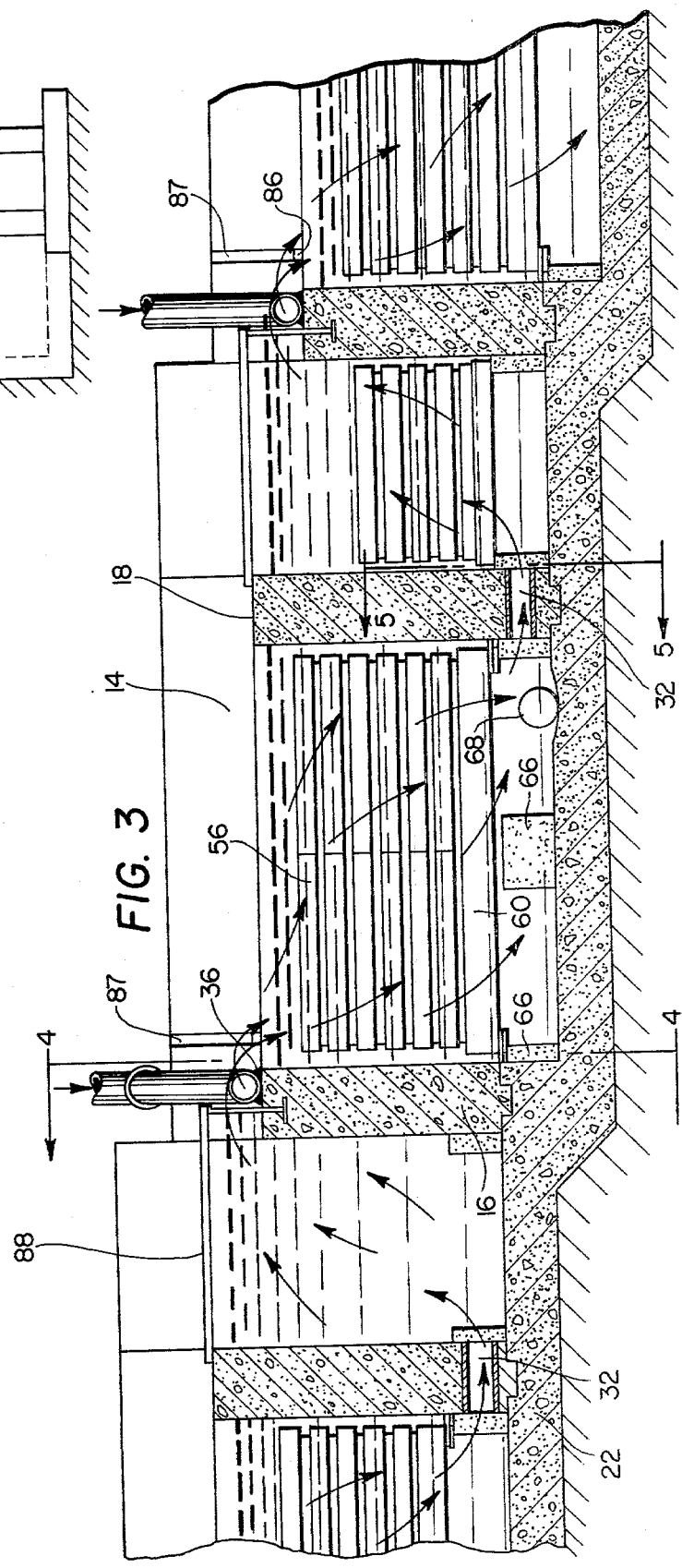

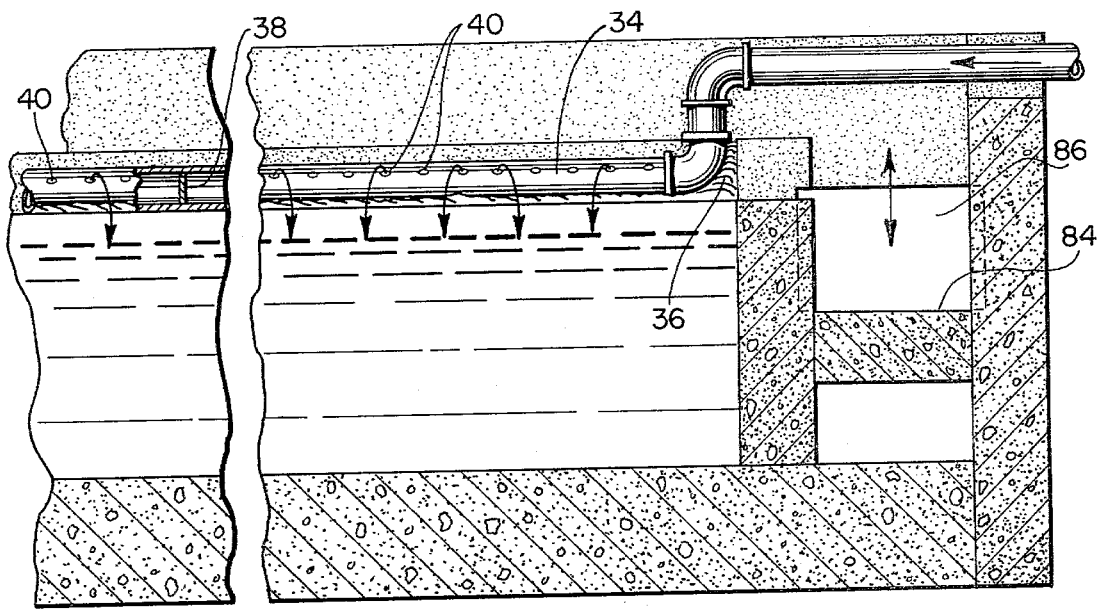
FIG. 4
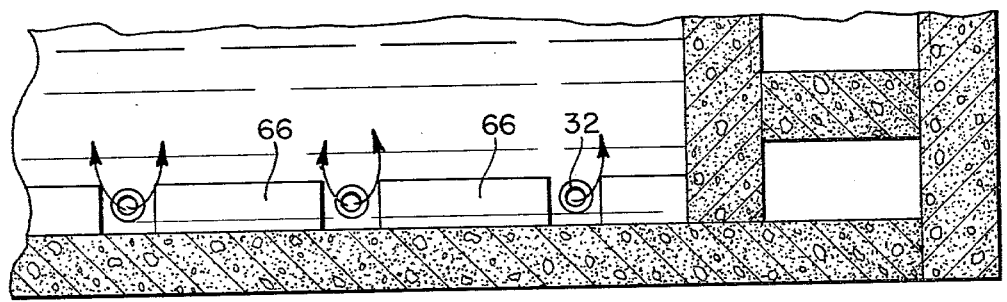
FIG. 5
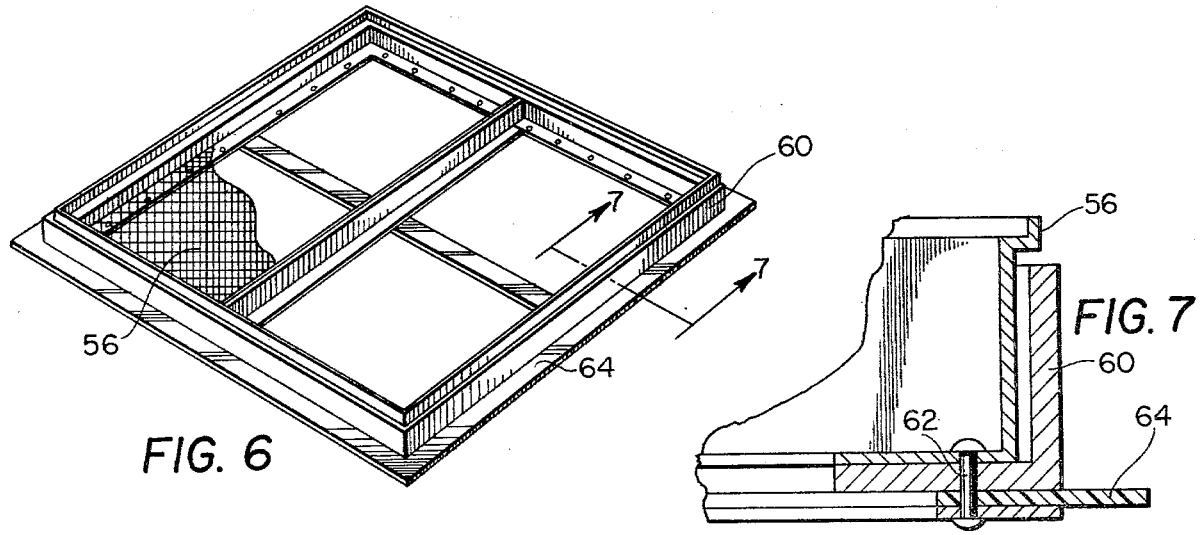
FIG. 6
FIG. 7

BIVALVE PRODUCTION FLUME

BACKGROUND AND SUMMARY OF THE INVENTION

The present invention is concerned with a flume construction for producing and growing bivalve molluscs for any desired subsequent use, such as human consumption. In this connection there has long been the need for an efficient production system and apparatus for producing and growing bivalves, such as oysters and clams, on a production basis whereby the voluminous number of bivalves required for restaurants and home consumption, as well as other purposes, may be efficiently produced and grown.

The present invention achieves this general objective by the provision and utilization of a novel production flume comprising a series of upwelling and production trenches in contiguous, alternate relation, i.e., each upwelling trench is followed by a production trench, with each production trench being positioned at a lower level than the next preceding production trench in order to facilitate gravitational flow of water through the trenches in a manner hereinafter to be described. Generally speaking, means are provided for introducing a continuous flow of brackish well water to the first upwelling trench, whereupon when the water in said trench reaches a predetermined level it overflows into the next adjacent production trench and then through outlet ports located adjacent the bottom of said production trench to the next succeeding upwelling trench and so on. Each production trench is provided with means for introducing a fresh supply of nutrient-bearing water with mixes with the water coming from the previous upwelling trench so as to provide a proper concentration of nutrient in each production trench for nourishing bivalves positioned therein. Each production trench additionally is provided with means whereby any desired amount of effluent may be drained therefrom. Means are also provided whereby any desired production trench or trenches may be bypassed, such as when it is desired to clean or repair a particular production trench without disrupting the operation of the other production trenches.

It is therefore a primary object of the present invention to provide a production flume which will support and contain bivalves during their growth cycle, and which will result in nourishment and growth of said bivalves in an efficient systematized manner, whereby the rate of production of grown bivalves is substantially increased over that of presently existing means.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 2 is a side elevational view thereof;

FIG. 3 is a fragmentary, enlarged, sectional view showing the upwelling and production trenches;

FIG. 4 is a section taken on line 4—4 of FIG. 3;

FIG. 5 is a section taken on line 5—5 of FIG. 3;

FIG. 6 is a perspective detail view of the trays utilized for maintaining the bivalves in the production trenches;

FIG. 7 is an enlarged sectional view taken on line 7—7 of FIG. 6; and

DESCRIPTION OF THE INVENTION

Figure 1:
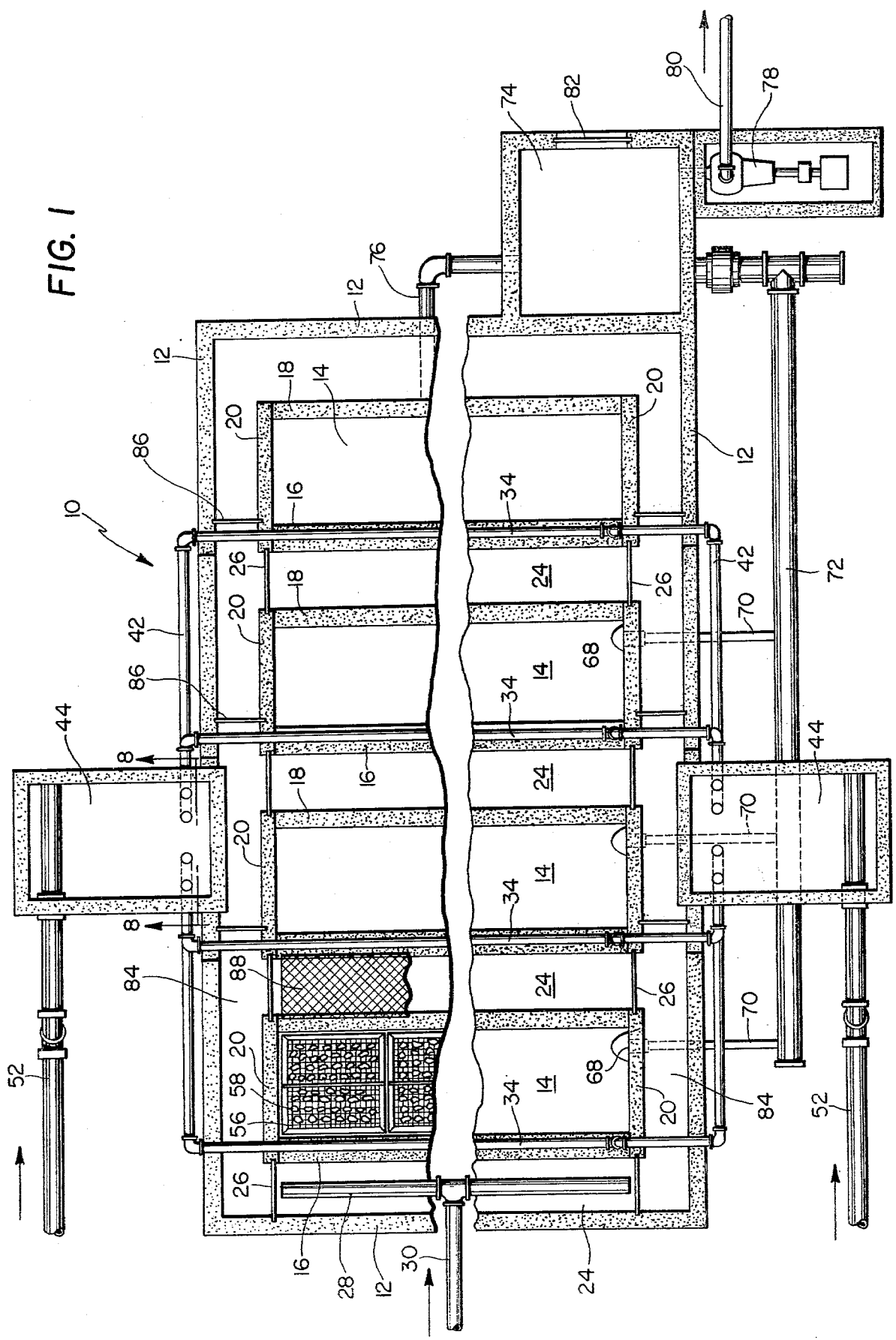
FIG. 1 is a plan view of the production flume of the present invention.

Referring now to the drawings, and particularly to FIG. 1, the production flume is shown generally at 10, said flume comprising an outer peripheral wall 12 within which are positioned a series of identical production trenches 14, each comprising a front wall 16, a rear wall 18, and end walls 20. The bottom of the flume 10 is provided with a suitable base 22, it being understood that the walls 12, 16, 18 and 20, as well as base 22, are constructed of any structurally strong material, such as concrete.

The space between each production trench 14 defines an upwelling trench 24, the ends of which are closed by gate means 26, so as to define a complete enclosure, it being understood that the other walls of each upwelling trench 24 are rear wall 18 of the next preceding production trench and front wall 16 of the next following production trench. For reasons hereinafter to become apparent, the gates 26 are slidably mounted for easy removal. As will be seen in FIG. 1, the first production trench, i.e., the one at the left end, also has an upwelling trench 24 just preceding it, said first upwelling trench being defined by outer wall 12 and front wall 16 of the first production trench, along with the slidably mounted gate means 26 at opposite ends thereof.

As will be seen most clearly in FIGS. 2 and 3, the first upwelling trench, the first production trench, and the next upwelling trench are all at the same level, while the next production trench and upwelling trench are at a stepped-down somewhat lower level as are each successive pairs of production and upwelling trenches. It will be understood that although the drawings show a series of four production and upwelling trenches, the invention is applicable to a lesser or greater number of such trenches, as may be desired. All of the production trenches are of identical size, construction and configuration to each other, while all of the upwelling trenches are likewise identical in size, construction and configuration to each other. However, due to the downward displacement of each successive pair of production and upwelling trenches, it will be seen (FIG. 2) that the top surfaces of each pair of walls 16, 18 are at a lower elevation than that of the preceding pair of walls 16, 18.

As will be seen most clearly in FIGS. 1 and 2, the first upwelling trench 24 has a conduit 28 therein extending substantially from end-to-end of said trench, said conduit being connected to inlet pipe 30 through which a supply of brackish well water (salt water) is introduced, it being understood that the conduit 28 has a plurality of orifices therein (not shown) whereby the salt water is uniformly introduced into said first upwelling trench 24. As will be seen most clearly in FIGS. 2 and 3, the height of front wall 16 of each production trench is somewhat less than the height of the walls of the preceding upwelling trench, as well as somewhat less than the height of the end walls of the production trench, whereupon when the salt water in the first upwelling trench rises to a level that surpasses the height of the first front wall 16, the water will flow over the top of said front wall into the next adjacent production trench.

Figure 8:
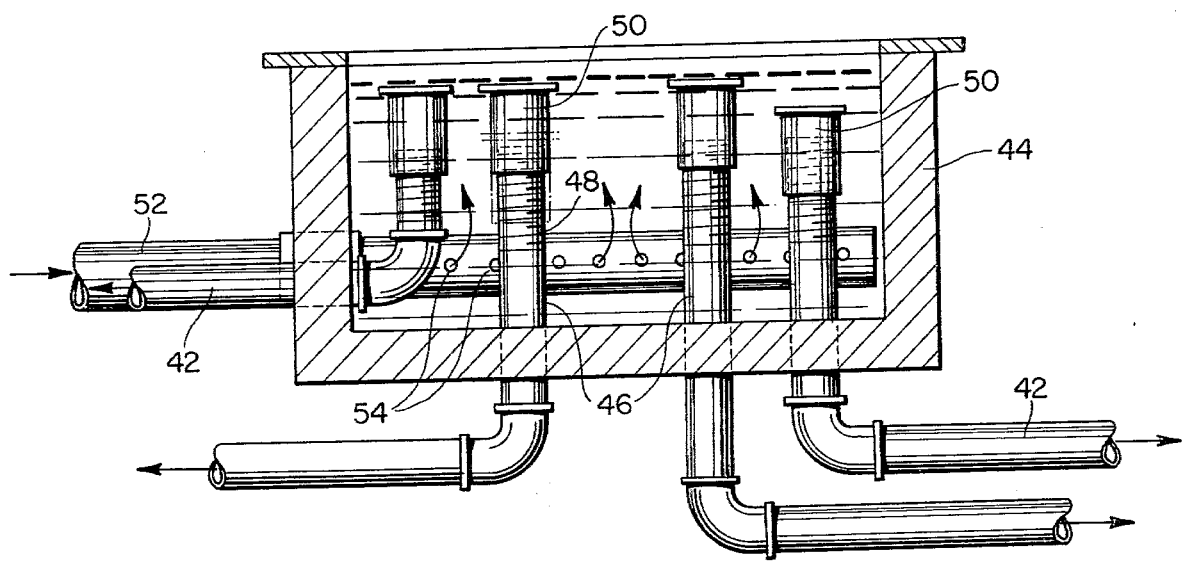
FIG. 8 is an enlarged section taken on line 8—8 of FIG. 1.

The rear wall 18 of each production trench is provided adjacent its bottom with a plurality of out-flow ports 32, through which the water from each production trench is free to flow into the next succeeding upwelling trench. Positioned on the top surface of each front wall 16 is a distribution conduit 34 which extends completely thereacross and is secured in position thereon by any suitable means, such as grouting 36. Each conduit 34 has a central partition 38 (FIG. 4) and further is provided with a plurality of discharge orifices 40 which face toward the production trench. Opposite ends of the conduits 34 are connected to pipes 42 which in turn communicate with distribution chambers 44, one of which is located on each side of the flume 10. Specifically, the pipes 42 each terminate in vertically extending portions 46, which pass through and into chamber 44, each of the portions 46 having an adjustable extension thereon whereby the height of each standpipe may be adjusted within the chamber. As will be seen most clearly in FIG. 8, the vertical portions 46 each terminate in a threaded portion 48 to which is threadedly coupled an end member 50. By threadedly adjusting the end members 50, the effective height of each standpipe 46 may be adjusted, although it will be understood that other suitable means for adjusting the height of each standpipe in the chamber 44 may be utilized. A supply conduit 52 extends into each chamber 44 for introducing thereto a supply of nutrient-bearing water. The most desirable nutrient for use in the growth and culture of bivalves is phytoplankton, since this is the chief natural food of bivalves. However, other suitable nutrients or food solutions, such as cow's blood, ground corn, etc. could conceivably be used. The nutrient-bearing water is fed to the chambers 44 through orifices 54 in supply conduit 52 so as to maintain a level of nutrient-bearing water in each chamber 44 which nutrient-bearing water in turn passes by gravity through pipes 42 to distribution conduits 34 and thence outwardly through the discharge orifices 40 located therein. It will be understood that there is a separate supply pipe 42 connected to each end of the distribution conduits 34, and since in the embodiment illustrated there are four production trenches and hence four distribution conduits, there are four separate supply pipes 42 on each side of flume 10, each connected to the adjacent end of one of the distribution conduits. By varying the heights of the end members 50 within their respective chambers 44, it will be seen that the pressure head and hence the rate of flow of nutrient-bearing water to each distribution conduit may be adjusted; and in fact, if it is desired to completely shut off the flow of nutrient-bearing water to any particular distribution conduit, it is simply necessary to raise the end member 50 of the proper supply pipe 42 to a point where it extends above the level of nutrient-bearing water in the chamber 44. Since the production trenches are relatively long from end-to-end, the presence of central partition 38 in each distribution conduit and the introduction of nutrient-bearing water to opposite ends of each distribution conduit, insure relatively uniform emission of nutrient-bearing water through the orifices 40. It will thus be seen that as the water from each upwelling trench overflows the front wall 16 of the next adjacent production trench, said water simultaneously comingles with the nutrient-bearing water being dispensed by the distribution conduits 34. Each production trench has positioned therein a plurality of stacked, perforated trays, each having positioned thereon a plurality of bivalves 58. The trays 56 are adapted to nest on top of each other, as shown most clearly in FIG. 3, the bottommost tray being secured to a peripheral frame or template 60, as by bolts 62 (FIG. 7), said bolts also securing to the bottom of said frame a resilient flap 64 which extends around the periphery of each frame and resiliently engages the surrounding walls of the production trench to prevent a flow of water downwardly along the outside of said stacked trays. The templates 60 are mounted in each production trench in spaced relation to the bottom of the trench, and in order to achieve this spaced relation a series of spaced steps 66 extend around the bottom edge of each production and upwelling trench, said frame 60 being seated on said steps, as most clearly illustrated in FIG. 3. This maintains the stack of trays in each production trench above the outflow ports 32 and also above drain openings 68, provided adjacent the bottom of each production trench. Each drain opening 68 is provided with suitable metering means (not shown) which may be adjusted to permit any desired rate of drain of water from the production trenches, said drain water being received by conduits 70, which in turn interconnect with a downwardly inclined drain pipe 72, which in turn introduces the drain water to a collection chamber 74. The last production trench 14, i.e., the one at the far right when viewing FIG. 1, has a drain 76 which communicates directly with collection chamber 74, it being understood that the water accummulated in chamber 74 may either be recirculated to the source of supply of nutrient-bearing water, as by pump 78 via conduit 80, or else it may be sent to waste, as by opening removable gate 82. Obviously, if desired, some of the drain water can be recirculated from chamber 74 as desirable and necessary, and the remaining drain water passed to waste.

In operation, each production trench is first filled with a plurality of frames or templates 60, each of which has stacked thereon a plurality of perforated trays 56 on which are positioned the bivalves to be nourished and cultured. It will thus be understood that each production trench is completely filled with stacked trays having the bivalves thereon, although as hereinbefore stated, the frame and bottom tray are maintained in spaced relation above the bottom of the trench. Salt water is then continuously supplied through conduit 28 to first upwelling trench 24. The water level in said trench rises until it reaches the height of adjacent front wall 16, at which point the water overflows said wall and cascades downwardly into the first production trench 14. At the same time, nutrient-bearing water is being emitted from distribution conduit 34 so that the water coming from upwelling trench 24 actually mixes and comingles with the nutrient-bearng water being emitted by conduit 34, whereby the water mixture entering production trench 14 has the proper proportion of nutrients therein. The nutrient-laden water filters downwardly through the perforated trays 56 whereby the bivalves positioned on said trays are contacted and nourished by said water. As previously explained, the peripheral flap 64 which surrounds each frame or template 60 insures that the flow of nutrient-bearing water will be downwardly through the trays containing the bivalves, rather than outwardly around the peripheries of said trays as the water filters downwardly and reaches the bottom of the first production trench 14, it passes through outflow ports 32 to the next adjacent upwelling trench 24 until the water level in that upwelling trench reaches a height where it commences to overflow the front wall 16 of the next production trench. Since much of the nutrients in the water have been absorbed by the bivalves in the first production trench, it is necessary to introduce a fresh supply of nutrient-bearing water to each production trench, and hence, as previously explained, the front wall 16 of each production trench has its own distribution conduit 34 positioned thereon, through which a fresh supply of nutrient-bearing water is mixed with the effluent from the next preceding upwelling trench. Because of the downgrading of each subsequent production trench, there will be a continuous gravitational flow throughout the flume 10 until the last production trench 14 (the one at the far right in Fig. 1) has been filled and commences to drain through conduit 76 to collection chamber 74. If it is desired to increase the capacity of the flume 10, it is possible to position trays of bivalves in the upwelling trenches, it being understood that the flume will still operate in exactly the same manner, except obviously a greater concentration of nutrient-bearing water will have to be introduced through conduits 34 to make up for the greater consumption of nutrients that will take place.

Since additional water is being introduced to the system at each producton trench, i.e., the nutrient-bearing water that is being introduced through conduits 34, it may be desirable to drain off a predetermined amount of water from each production trench in order to maintain the proper overall volume of water in the flume. The metered drains 68 are operable to achieve this purpose, it being understood that any water which is drained from the production trenches, as well as the water which drains from the last production trench is fed to a collection chamber 74 from whence the collected water may either be recirculated to the source of supply of the nutrient-bearing water, or else sent to waste.

The amount of nutrient-bearing water emitted by each distribution conduit 34 may be adjusted by regulating the height of its respective standpipe in chamber 44. More specifically, by upwardly threading the end member of a particular standpipe, the pressure head of liquid in chamber 44 is reduced and hence the rate of flow through the respective conduit 34 is correspondingly reduced. Of course, if the end member is threaded upwardly to the extent that it extends above the level of liquid in chamber 44, then no nutrient-bearing water will be introduced to the associated conduit 34, and hence the adjustability of end members 50 provides a convenient means for completely shutting off the flow of nutrient-bearing water to any particular distribution conduit. For example, this might be desired where it is necessary to clean or repair a particular production trench. In this connection the flume 10 has the capacity of remaining operative while bypassing a particular production trench. This is achieved by removing the end gates 26 of the next preceding upwelling trench, whereupon the water entering therein will flow outwardly to inclined gutters 84 which incline downwardly along opposite ends of the trenches 14 and 24. Thus, the water in the upwelling trench will not rise to a level sufficient to overflow adjacent front wall 16, but rather will flow outwardly into the gutters 84 and will flow downwardly by gravity through said inclined gutters until blocked against further downward flow by removable weir boards 86 slidably mounted in grooves 84. Specifically, the removable weir boards 86 are positioned in gutters 84 at locations just beyond each upwelling trench, whereupon if it is desired to bypass a particular production trench, the end gates of the next preceding upwelling trench will be removed and then weir boards 86 will be mounted in gutters 84 to divert the flow of water into a selected subsequent upwelling trench. Of course, the distribution conduits for the production trenches being bypassed are rendered inoperative by raising the end members of their respective standpipes in chamber 44, above the liquid level therein and at the same time, whatever water exists in the production trench or trenches that are being bypassed is removed via drains 68. In addition to repair and cleaning requirements, this capability also permits a particular production to be harvested without otherwise interferring with the operation of the flume 10.

Access to the production trenches for harvesting and maintenance is provided by grated walkways 88 which extend over and cover each of the upwelling trenches. Each of the production trenches may be provided with sectional, removable covers (not shown) which function to block the entry of sunlight to the production trench, hence reducing the likelihood of biofouling within the trench.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A bivalve productin flume comprising a first upwelling trench, a first production trench contiguous thereto with a common wall therebetween, means for introducing water to said first upwelling trench, means for causing water to overflow from said first upwelling trench into said first production trench when the water in the former reaches a predetermined level therein, means located adjacent said common wall and extending substantially thereacross for substantially continuously co-mingling nutrient-bearing water with said overflow whereby the water entering said first production trench is a mixture of the water from said first upwelling trench and said nutrient-bearing water, a plurality of perforated trays in stacked relation in said first production trench with bivalves positioned thereon whereby said water mixture filters downwardly through said trays and bivalves, and means adjacent the bottom of said first production trench for permitting out-flow of said water mixture therefrom.

2. The flume of claim 1 further comprising identical second upwelling and production trenches in contiguous series with said first upwelling and production trenches, said out-flow means from said first production trench communicating with said second upwelling trench, whereby water from the former enters the latter and rises until it overflows into said second production trench while simultaneously co-mingling with a fresh supply of nutrient-bearing water.

3. A bivalve production flume comprising a first upwelling trench, a first production trench contiguous thereto with a common wall therebetween, means for introducing water to said first upwelling trench, means for causing water to overflow from said first upwelling trench into said first production trench when the water in the former reaches a predetermined level therein, means located adjacent said common wall for co-mingling nutrient-bearing water with said overflow whereby the water entering said first production trench is a mixture of water from said first upwelling trench and said nutrient-bearing water, a plurality of perforated trays in stacked relation in said first production trench with bivalves positioned thereon whereby said water mixture filters downwardly through said trays and bivalves, and means adjacent the bottom of said first production trench for permitting out-flow of said water mixture therefrom, identical second upwelling and production trenches in contiguous series with said first upwelling and production trenches, said out-flow means from said first production trench communicating with said second upwelling trench, whereby water from the former enters the latter and rises until it overflows a second common wall into said second production trench while simultaneously co-mingling with a fresh supply of nutrient-bearing water, said overflow causing means residing in the fact that said common walls between said first upwelling and production trenches and said second upwelling and production trenches are of less height than the other walls of said trenches, whereby when the level of water in each upwelling trench surpasses the height of its respective said common wall, the water flows over the top of said wall into the next succeeding production trench, said co-mingling means comprising a conduit positioned on the top surface of and extending across each common wall from end to end, a series of orifices in said conduit facing the next succeeding production trench, and means for introducing nutrient-bearing water into said conduit for emission through said orifices, whereby water overflowing from said upwelling trenches flows over said conduits and mixes with the nutrient-bearing water being emitted therefrom.

4. In the flume of claim 3, said conduit having a centrally disposed partition wall, said nutrient-bearing water being introduced to opposite ends of said conduit.

5. In the flume of claim 3, means for selectively regulating the rate of flow of nutrient-bearing water from each conduit.

6. In the flume of claim 3, said first upwelling and production trenches and said second upwelling trench all being at substantially the same level, said second production trench being downwardly displaced with respect thereto.

7. In the flume of claim 6, said production trenches each having metered drain means adjacent their bottom whereby a predetermined amount of water may be drained off.

8. In the flume of claim 7, said drain means communicating with a downwardly inclined drain pipe, said pipe communicating with a drain collection chamber.

9. In the flume of claim 7, means in each production trench for mounting said stack of trays in spaced relation to the bottom of said trench above said out-flow and drain means.

10. In the flume of claim 9, an outwardly extending peripheral resilient flap connected to said stacks of trays, said flap resiliently engaging the walls of said trench to insure passage of said water mixture down through said trays.

11. A bivalve production flume comprising a first upwelling trench, a first production trench contiguous thereto with a common wall therebetween, means for introducing water to said first upwelling trench, means for causing water to overflow from said first upwelling trench into said first production trench when the water in the former reaches a predetermined level therein, means located adjacent said common wall for comingling nutrient-bearing water with said overflow whereby the water entering said first production trench is a mixture of the water from said first upwelling trench and said nutrient-bearing water, a plurality of perforated trays in stacked relation in said first production trench with bivalves positioned thereon whereby said water mixture filters downwardly through said trays and bivalves, and means adjacent the bottom of said first production trench for permitting out-flow of said water mixture therefrom, identical second upwelling and production trenches in contiguous series with said first upwelling and production trenches, said out-flow means from said first production trench communicating with said second upwelling trench, whereby water from the former enters the latter and rises until it overflows into said second production trench while simultaneously co-mingling with a fresh supply of nutrient-bearing water, and means operable to permit bypassing of any selected production trench.

12. In the flume of claim 11, said bypass means comprising normally closed gate means at least at one end of each upwelling trench selectively movable to an open position, an inclined peripheral gutter extending along the ends of said trenches, weir boards in said gutter located just beyond said second upwelling trench and movable between an open and a closed position, whereby when it is desired to bypass any production trench, the gate means of its respective upwelling trench are opened permitting water therein to flow into and down said gutter until diverted by a closed weir board into a subsequent upwelling trench whose gate means have also been opened.

13. A bivalve production flume comprising a series of aligned transversely extending production trenches each having front, rear, and end walls, the rear wall of each production trench being spaced from the front wall of the next succeeding production trench, said spaces defining a series of upwelling trenches, gate means at the opposite ends of said upwelling trenches defining a complete enclosure, each producton trench being at a lower level than its next preceding upwelling and production trenches, the front wall of each production trench being of lesser height than its end walls and lesser height than the other walls of the next preceding upwelling trench, a plurality of out-flow openings adjacent the bottom of the rear wall of each production trench communicating with the next following upwelling trench, metered drain means located adjacent the bottom of and extending through one of the end walls of each production trench and communicating with an inclined drain pipe, means for continuously introducing salt water to the first upwelling trench, said salt water overflowing over the foreshortened front wall of the adjacent production trench to fill same and then flowing through said out-flow openings to the next upwelling trench etc., a distribution chamber located adjacent said flume, means for introducing nutrient-bearing water to said chamber, a distribution conduit positioned on the top surface of each said front wall and extending from end to end thereof, a plurality of discharge orifices in said conduits facing the production trenches, pipes extending from said chamber to each distribution conduit for supplying nutrient-bearing water thereto whereby when water from each upwelling trench overflows the front wall of the next succeeding production trench, it mixes with nutrient-bearing water being discharged through said orifices, and means in each production trench for supporting bivalves therein.

14. The flume of claim 13, said bivalve supporting means comprising a plurality of stacked perforated trays, a peripheral flexible flap secured to and extending outwardly from said stack of trays into resilient engagement with the walls of said trench to insure passage of the water through said trays.

15. The flume of claim 13, said supply pipes having vertically disposed terminal portions located within said distribution chamber, means for adjusting the height of said pipes in said chamber, whereby the adjustment of each pipe relative to the liquid level in said chamber determines the rate of flow of the nutrient-bearing water to its respective distribution conduit.

16. The flume of claim 15, said distribution conduit having a centrally disposed partition, said supply pipes communicating with opposite ends of said conduit.

17. The flume of claim 13, said gate means being movable to an open position, an inclined gutter extending along the ends of said trenches, and a plurality of weir boards in said gutter movable between an open and closed position, said weir boards being located slightly beyond each upwelling trench, whereby if it is desired to bypass any selected production trench, the gate means of the next preceding upwelling trench are opened permitting water therein to flow into and down said gutter until diverted by a closed weir board into a subsequent upwelling trench whose gate means have also been opened.

* * * * *